United States Patent [19]

FitzGerald et al.

[11] 4,135,754

[45] Jan. 23, 1979

[54] ILLUMINATED AERODYNAMIC ENCLOSURE FOR TRUCKS AND TRAILERS

[76] Inventors: Joseph M. FitzGerald; Ruthann P. FitzGerald, both of 8690 Los Coyotes Dr., Buena Park, Calif. 90620

[21] Appl. No.: 801,581

[22] Filed: May 31, 1977

[51] Int. Cl.² .............................................. B60J 1/04
[52] U.S. Cl. ...................................... 296/1 S; 40/541
[58] Field of Search ................ 296/1 S; 280/154.5 R; 40/129 R, 129 C, 129 B

[56] References Cited

U.S. PATENT DOCUMENTS

| 1,390,561 | 9/1921 | Kelly | 40/129 C |
| 2,758,401 | 8/1956 | Wilson | 280/154.5 R |
| 3,241,857 | 3/1966 | Goetz | 280/154.5 R |
| 4,021,069 | 5/1977 | Hersh | 296/1 S |

Primary Examiner—Robert R. Song
Attorney, Agent, or Firm—Jones, Tullar & Copper

[57] ABSTRACT

An illuminated enclosure mounted on the vertical front wall of a vehicle to reduce aerodynamic drag of the vehicle and to display a trademark, name, logo or the like. The major portion of the enclosure is first painted black so as to be substantially impervious to the passage of light. An illuminated area is convered by translucent paint or a decalcomania arranged to display the trademark, name or logo to be displayed. A lighting device is mounted on the front wall of the vehicle and connected to its electrical system. The lighting device has a plurality of spaced light bulbs arranged transversely across the midportion of the illuminated area. In use, the illuminated area is lighted from within the enclosure for observation by others as the vehicle moves along the highway.

1 Claim, 4 Drawing Figures

U.S. Patent    Jan. 23, 1979    4,135,754
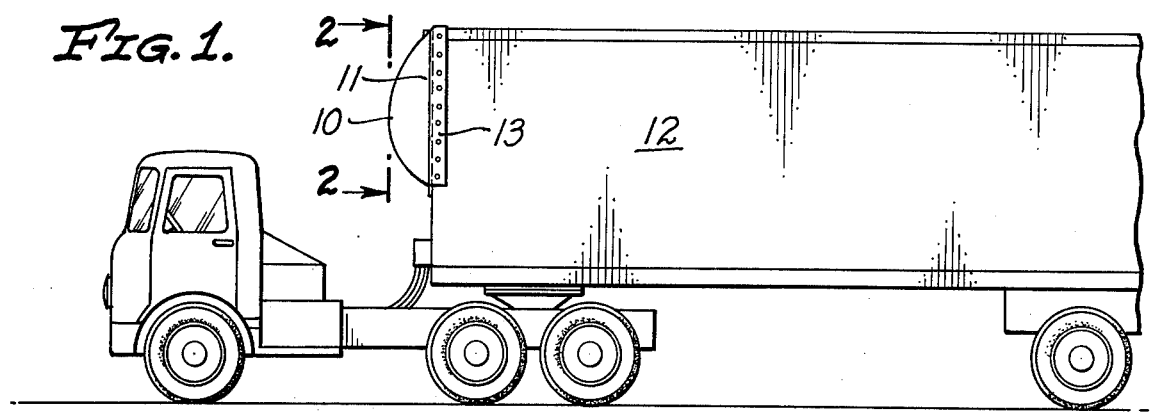
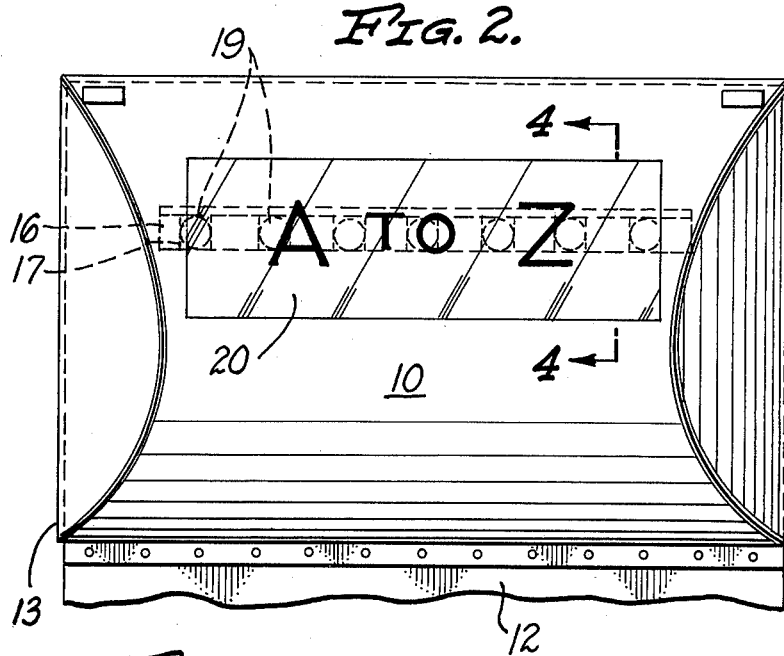
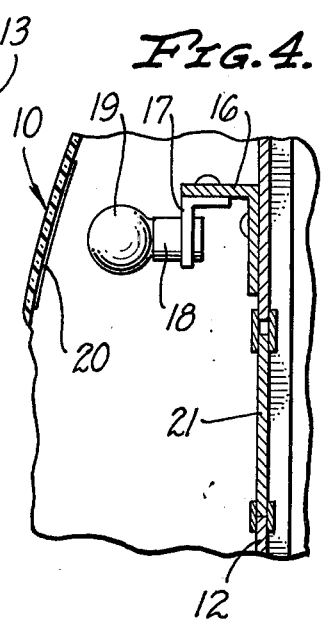
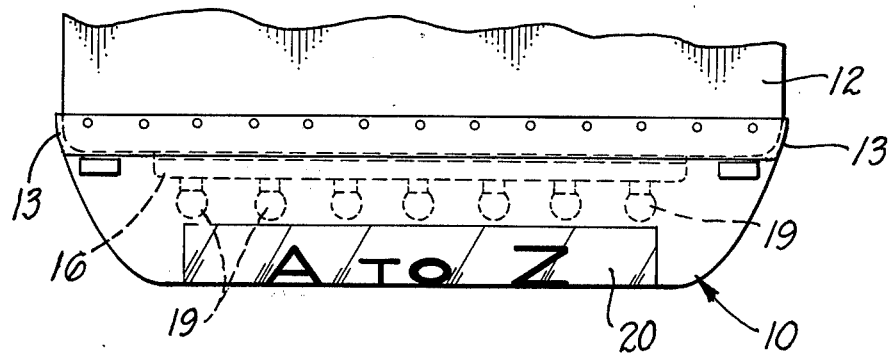

ILLUMINATED AERODYNAMIC ENCLOSURE FOR TRUCKS AND TRAILERS

BACKGROUND OF THE INVENTION

1. Field of the Invention

The invention relates to an illuminated aerodynamic enclosure for the front end of a truck or trailer.

2. Description of the Prior Art

Aerodynamic enclosures are known for mounting on the front walls of trucks and trailers which travel at high speeds along highways and freeways. Such enclosures act to streamline the flow of air around the truck or trailer body so as to minimize the turbulence. They provide a substantial decrease in fuel consumption and also provide for easier handling of the vehicle. Such enclosures are shown, by way of example, in U.S. Pat. Nos. 4,021,069; 2,514,695; 3,425,740 and 3,814,472.

SUMMARY OF THE INVENTION

The present invention provides an enclosure of the type described which has internal means for illuminating a portion of the enclosure from the interior to provide an advertisement or the like such as the name of a company or product, insignia or other illustrated message, sign or effect of whatever type may be desired.

The invention preferably comprises masking all of the enclosure except for a small translucent area on which the insignia, message or design is to appear. Illuminating means is provided within the interior of the enclosure. Such means may conveniently be mounted upon the front wall of the vehicle and connected to the electrical system of the vehicle for selective operation by the driver.

It is accordingly an object of the invention to provide an illuminated aerodynamic enclosure for trucks and trailers having all of the advantages and benefits of the structure set forth above.

Another object of the invention is to provide such a device which is simple and economical to manufacture and install and which is effective and attracts attention when in use.

The invention also comprises such other objects, advantages and capabilities as will later more fully appear and which are inherently possessed by the invention.

While there is shown in the accompanying drawings a preferred embodiment of the invention, it should be understood that the same is susceptible of modification and change without departing from the spirit of the invention.

DESCRIPTION OF THE DRAWINGS

FIG. 1 is an exploded view of an enclosure and the front part of a trailer body;

FIG. 2 is a vertical sectional view of the illumination means;

FIG. 3 is a front elevational view of an enclosure mounted on a trailer body.

DESCRIPTION OF THE PREFERRED EMBODIMENT

A preferred embodiment which has been selected to illustrate the invention comprises a convex aerodynamic enclosure 10, which is preferably formed of fiberglass or other suitable material. The enclosure 10 is adapted to be mounted on the front vertical wall 11 of a truck or trailer vehicle 12. For aerodynamic purposes, the enclosure 10 functions best if it extends across the entire area between both sides of the front wall 11 and a substantial distance downwardly from the top of the front wall 11. This positioning also acts to place the illuminated portion in an excellent position for viewing by persons in other vehicles or those on the streets or highways.

The enclosure 10 is preferably provided with a pair of side flanges 13 which fit over and are secured by rivets or other suitable fastening means to the side edges of the front wall 12. A top flange 14 fits over and is secured to the top of the front wall 12. A bottom flange 15 customarily extends transversely across the front wall 12 a substantial distance downwardly from its top edge. The bottom flange 15 is customarily disposed somewhat above the lower edge of the front wall 12. The enclosure 10 may be sealed around its periphery with elastic caulking material.

The lighting device preferably comprises a first angle iron 16 which is secured to the front wall 12 by rivets or other suitable fastening means. A second angle iron 17 is mounted beneath the horizontally directed flange of the first angle iron 16. A plurality of spaced electrical sockets 18 extend through openings formed in the vertical portion of the second angle iron 17. The sockets 18 are directed so that bulbs 19 which are mounted in them extend forwardly from the front wall 12 toward the inside of the enclosure 10. The number and spacing of the bulbs 19 may vary, depending upon the particular sign or logo to be illustrated.

The enclosure 10 is provided with an area to be illuminated which may be formed in the manner set forth hereinafter in this specification. The angle irons 16 and 17 are preferably oriented so that they extend transversely across the illuminated area 20 adjacent to its midportion.

The front wall 12 of the truck or trailer may be provided with an access door 21, which is preferably located directly beneath the angle irons 16 and 17 for repair and maintenance of the lighting device. Electrical wiring connects the bulbs 19 to the electrical circuit of the vehicle. The bulbs 19 may be connected for operation simultaneously with the vehicle lights or may be connected to an independent switch.

The enclosure 10 is preferably provided on its outer surface with a clear gel coat, so that it is completely transparent. The entire outer surface is first sanded with 320 grit "wet or dry" sandpaper to take off the gloss. The user should then mask out the proposed illuminated area 20. A first layer of paint, such as a good quality acrylic automotive paint, is then applied to the illuminated area 20. This first layer customarily comprises the color of the sign. The first layer should be applied in a thin, even coat.

When the first layer is dry, the user then masks off the letters within the illuminated area 20 as the user wants them to appear at night. The paint around the letters should then be sanded with 320 grit paper.

The entire exterior of the enclosure 10 should then be painted black in order to intensify the definition of the illuminated letters to prevent light from passing through any portion of the enclosure other than the illuminated area 20. After it is dry, the black layer should be sanded with 320 grit paper.

The exterior of the enclosure 10 should then be painted in the finished coat color desired. This is customarily white, with an oval, rectangle or other desired shape disposed around the letters in a light color to conform to the particular user's trademark, logo, type or design. The masking is then removed to reveal the translucent letters or design.

The shape of the enclosure 10 and its aerodynamic function and effects are fully set forth in U.S. Pat. No. 4,021,069 issued May 3, 1977.

We claim:

1. In combination with a cargo carrying vehicle having forward, side and top walls, said forward wall being contained in a substantially vertical plane disposed normal to the direction of travel of said vehicle, an aerodynamic fairing mounted on said forward wall for directing air flow about said vehicle to reduce its aerodynamic drag, said fairing and a major portion of said vehicle being substantially opaque;

means forming a translucent area in at least a forwardly facing portion of said aerodynamic fairing, said translucent area being an integral part of said fairing whereby the surface contour of said translucent area forms a part of the surface of said fairing;

lighting means including at least one electrical socket adapted to receive a light bulb;

bracket means secured to said forward wall of said vehicle within said aerodynamic fairing;

mounting means for said electrical socket, said mounting means being secured to said bracket and extending transversely across said forward wall to support said electrical socket within said aerodynamic fairing and to align said light bulb with said translucent area;

means disposed within said translucent area to form a display to be illuminated; and means for connecting said electrical socket to the electrical system of said vehicle for illumination of said display.

* * * * *